(12) United States Patent
Blinick et al.

(10) Patent No.: US 7,596,651 B2
(45) Date of Patent: Sep. 29, 2009

(54) MULTI-CHARACTER ADAPTER CARD

(75) Inventors: Stephen L. Blinick, Tucson, AZ (US); Carol Spanel, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 11/754,821

(22) Filed: May 29, 2007

(65) Prior Publication Data

US 2008/0301345 A1 Dec. 4, 2008

(51) Int. Cl.
*G06F 9/06* (2006.01)
(52) U.S. Cl. .............................. 710/301; 710/14; 713/1
(58) Field of Classification Search ......... 710/301–304, 710/8–14; 713/1–100
See application file for complete search history.

(56) References Cited

U.S. PATENT DOCUMENTS

| | | | | |
|---|---|---|---|---|
| 5,038,320 A | | 8/1991 | Heath et al. ................. 364/900 |
| 5,043,931 A | | 8/1991 | Kovach et al. .............. 364/579 |
| 5,253,357 A | * | 10/1993 | Allen et al. .................. 711/115 |
| 5,329,634 A | | 7/1994 | Thompson ................... 395/500 |
| 5,353,432 A | * | 10/1994 | Richek et al. ................. 710/10 |
| 5,371,892 A | * | 12/1994 | Petersen et al. ............... 713/1 |
| 5,428,748 A | * | 6/1995 | Davidson et al. .............. 710/9 |
| 5,428,813 A | * | 6/1995 | Simmering et al. .......... 712/38 |
| 5,465,106 A | * | 11/1995 | Keech et al. ................ 345/204 |
| 5,544,092 A | * | 8/1996 | Gunther et al. ............... 713/1 |
| 5,727,207 A | | 3/1998 | Gates et al. ................. 395/651 |
| 5,761,528 A | | 6/1998 | Arai |
| 5,787,306 A | * | 7/1998 | Michael ......................... 710/9 |
| 5,881,281 A | * | 3/1999 | Gates et al. .................... 713/1 |
| 5,925,116 A | * | 7/1999 | Minamizawa ................ 710/64 |
| 5,978,862 A | * | 11/1999 | Kou et al. ..................... 710/14 |
| 5,987,534 A | * | 11/1999 | Shibayama ................... 710/14 |
| 5,991,842 A | * | 11/1999 | Takayama ................... 710/105 |
| 6,012,103 A | * | 1/2000 | Sartore et al. ................. 710/8 |
| 6,029,211 A | | 2/2000 | Nakashima |
| 6,092,146 A | * | 7/2000 | Dell et al. ...................... 711/5 |
| 6,145,019 A | * | 11/2000 | Firooz et al. .................. 710/8 |
| 6,182,204 B1 | | 1/2001 | Nakashima |
| 6,526,559 B2 | * | 2/2003 | Schiefele et al. ............. 716/16 |
| 6,711,658 B2 | * | 3/2004 | Nylund ....................... 711/170 |
| 6,976,118 B1 | * | 12/2005 | Baier ......................... 711/170 |
| 2001/0047471 A1 | | 11/2001 | Johnson ........................ 713/1 |
| 2004/0192380 A1 | | 9/2004 | Chen ......................... 455/556.1 |
| 2007/0186013 A1 | * | 8/2007 | Brown .......................... 710/8 |

* cited by examiner

*Primary Examiner*—Paul R Myers
(74) *Attorney, Agent, or Firm*—Kunzler & McKenzie

(57) ABSTRACT

One embodiment of an adapter card in accordance with the invention includes a circuit board connectable to a motherboard of a computer system. A logic chip is connected to the circuit board to provide functionality to the adapter card. One or more programmable devices are connected to the circuit board and store data read by the logic chip upon initialization. This data may include first character data to program the logic chip to have a first character and second character data to program the logic chip to have a second character. A switching mechanism is provided to switch between the first and second character data in response to an external input, thereby causing the logic chip to read one of the first and second character data.

27 Claims, 5 Drawing Sheets

MULTI-CHARACTER ADAPTER CARD

BACKGROUND OF THE INVENTION

1. Field of the Invention

This invention relates to computer adapter cards and more particularly to computer adapter cards having improved versatility.

2. Description of the Related Art

To provide additional versatility and functionality, today's computer systems are often designed to accept and interface with adapter cards, also known as expansion boards, accessory cards, or expansion cards. These adapter cards are generally printed circuit boards that can be inserted into or otherwise connected to an expansion slot or connector on a computer's motherboard. Many adapter cards incorporate one or more ASIC chips ("ASICs") designed to provide unique functions to the adapter cards. These ASICs may be used in place of a general-purpose commercial logic chips to simplify the design of the circuit board. Many ASICs integrate several functions or logic control blocks into a single chip. Although development costs can be quite high, ASICs may lower manufacturing costs where large quantities of the chips are needed.

Many adapter cards include a memory device such as an EEPROM, flash memory, or other programmable device interface which can be used to personalize ASICs on the adapter cards. For example, code or data stored on a memory device may be used to set internal registers of the ASIC. The ASIC may read this code or data when the chip is powered on, after a reset, or when code instructs it to do so. This allows an adapter card to become active with a defined personality or character.

In some cases, it may be desirable for an adapter card to exhibit different characteristics depending on the application of the adapter card or where the adapter card is placed in a computer system. In some cases, multiple versions of an adapter card may be provided to handle different applications or configurations of a computer system. In certain cases, this is accomplished using different ASICs in adapter cards intended for different applications. In other cases, the personality or characteristics of an adapter card might be programmed by external software to configure the adapter card for a particular application. Although effective, these techniques can be inefficient and costly.

In view of the foregoing, what is needed is an adapter card capable of assuming multiple personalities or characters. Such an adapter carder could be used to exhibit different characteristics depending on the application of it used for or where the adapter card is placed in a computer system. Ideally, such an adapter card could utilize the same ASIC for both applications and could be programmed without the need for external software. Further needed is an adapter card that can be switched from one character to another using a simple external control.

SUMMARY OF THE INVENTION

The present invention has been developed in response to the present state of the art, and in particular, in response to the problems and needs in the art that have not yet been fully solved by currently available apparatus and methods. Accordingly, the present invention has been developed to provide an adapter card capable of assuming multiple personalities or characters and which is dynamically reconfigurable in situ.

In a first aspect of the invention, one embodiment of an adapter card in accordance with the invention includes a circuit board connectable to a motherboard of a computer system. A logic chip is connected to the circuit board to provide functionality to the adapter card. One or more programmable devices are connected to the circuit board and store data read by the logic chip upon initialization. This data may include first character data to program the logic chip to have a first character and second character data to program the logic chip to have a second character. A switching mechanism is provided to switch between the first and second character data in response to an external input, thereby causing the logic chip to read one of the first and second character data.

In selected embodiments, the one or more programmable devices include first and second programmable devices wherein the first programmable device stores the first character data and the second programmable device stores the second character data. In such embodiments, the switching mechanism may modify an address of the first and second programmable devices to switch between the first and second character data. In other embodiments, the switching mechanism may selectively assert and de-assert a chip select line of the first and second programmable devices to switch between the first and second character data.

In other embodiments, the one or more programmable device may include a single programmable device storing both the first and second character data in different address ranges of the programmable device. In such embodiments, the switching mechanism may modify an address used to access the character data on the single programmable device, thereby causing the logic chip to read from a different address range of the single programmable device.

In another aspect of the invention, one embodiment of a method in accordance with the invention includes providing an adapter card connectable to a motherboard of a computer system and integrating, on the adapter card, a logic chip to provide functionality to the adapter card. The method includes reading data, by the logic chip, upon initialization. This data may include first character data to program the logic chip to have a first character, and second character data to program the logic chip to have a second character. The method includes switching, in response to an external input, between the first and second character data, thereby causing the logic chip to read one of the first and second character data.

In another aspect of the invention, one embodiment of a system includes a computer system configured to receive an adapter card to enhance the functionality of the computer system. An adapter card is connected to the computer system and includes a logic chip connected to the adapter card to provide functionality to the adapter card. One or more programmable devices are connected to the adapter card to store data read by the logic chip upon initialization. This data may include first character data to program the logic chip to have a first character and second character data to program the logic chip to have a second character. A switching mechanism, controlled by an external input, switches between the first and second character data, thereby causing the logic chip to read one of the first and second character data.

In yet another aspect of the invention, one embodiment of an apparatus includes means for connecting an adapter card to a computer system to enhance the functionality thereof. The adapter card includes a logic chip to provide functionality to the adapter card. The apparatus further includes means for storing data read by the logic chip upon initialization. This data includes first character data to program the logic chip to have a first character and second character data to program the logic chip to have a second character. The apparatus also includes means for switching, in response to an external input, between the first and second character data such that the logic chip assumes one of the first and second characters.

In another aspect of the invention, an apparatus in accordance with the invention includes an adapter card connectable to a motherboard of a computer system and an application-specific integrated chip (ASIC) integrated with the adapter card to provide functionality thereto. The ASIC includes at least one register. One or more programmable devices are integrated onto the adapter card to store data loaded into the at least one register upon initialization. This data includes first character data to program the ASIC with a first character, and second character data to program the ASIC with a second character. A switching mechanism, controlled by an external input, is provided to switch between the first and second character data, thereby causing the at least one register to load one of the first and second character data.

The present invention provides a novel adapter card capable of assuming multiple characters. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
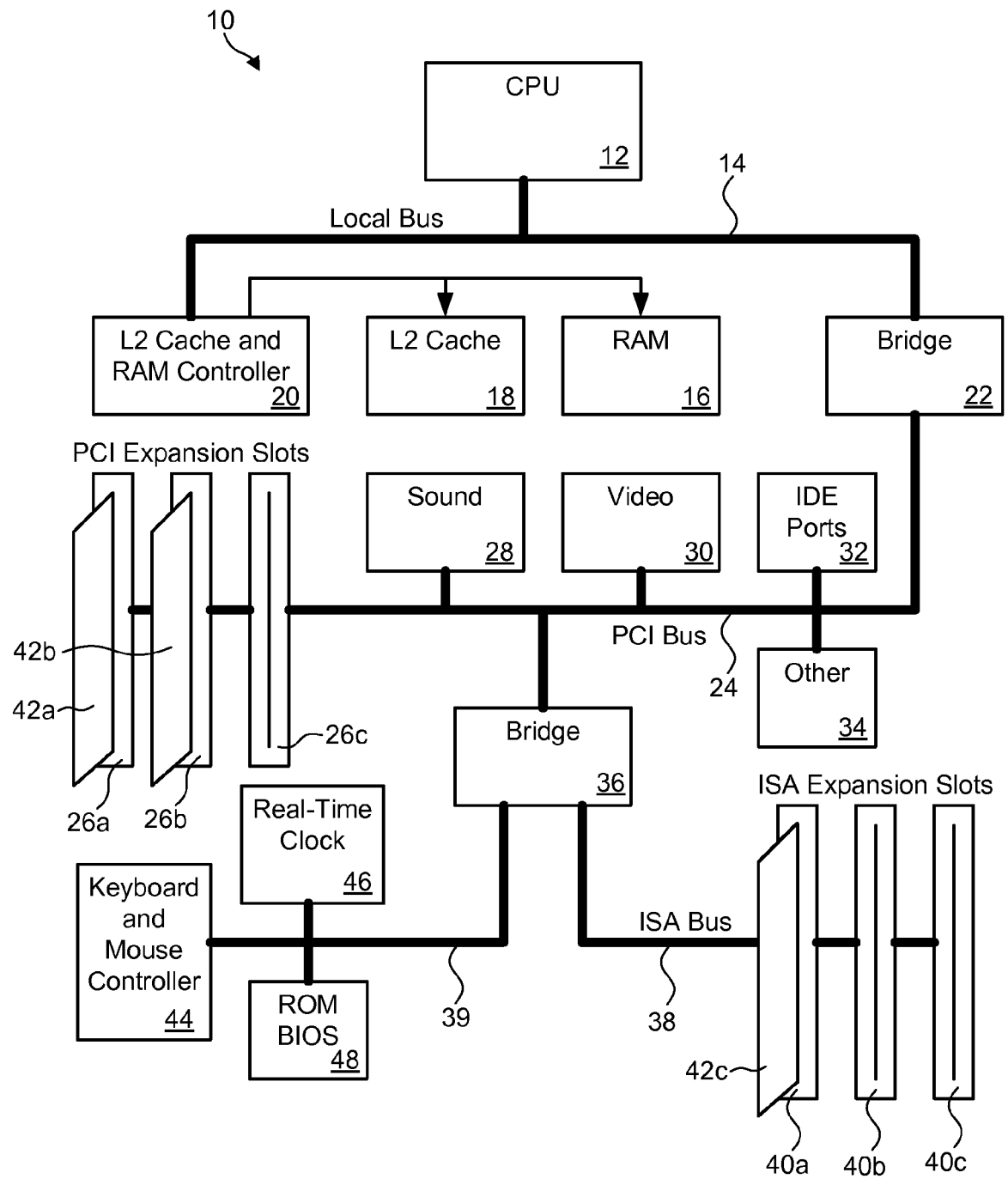
FIG. 1 is a high-level schematic block diagram of one embodiment of a computer system for receiving an adapter card in accordance with the invention.

Referring to FIG. 1, one embodiment of a computer system 10 useable with an adapter card 42 in accordance with the invention is illustrated. As shown, a computer system 10, such as a personal computer 10, a workstation 10, a server 10, or other computer 10 may include various components providing various functionalities thereto. For example, a computer system 10 may include a central processing unit 12 to process executable and operational data stored in a connected memory device such as random access memory 16, or a hard drive connected to an IDE port 32. The CPU 12 may be connected to a main or local bus 14 having a relatively large bandwidth to accommodate the speed of the CPU 12. The local bus 14 may be connected to various high-speed memory devices 16, 18 where instructions and operational data may be stored for ready and immediate access by the CPU 12.

The controller 20 may act as an interface 20 between the CPU 12 and the memory 16, 18. For example, local memory may include an L2 cache 18 and random access memory 16. The L2 cache 18 may be used to speed up data transfers between the CPU 12 and random access memory 16. The L2 cache 18 may also serve as a staging area to speed up instruction execution and data retrieval. The local bus 14 may connect to a bridge 22 acting as an interface between the local bus 14 and other buses 24, such as a PCI bus 24. The bridge 22 may function as an arbitrator or "traffic cop" for data exchanges between the buses 14, 24, and may resolve differences in protocols, clock speeds, and the like between the buses 14, 24.

A bus, such as a PCI bus 24, may be used to interconnect, switch, or multiplex data exchanged between various onboard devices 28, 30, 32, 34, as well as add-on or adapter cards 42a, 42b (also expansion cards, expansion boards, and accessory cards) installed into one or several expansion slots 26a-c. In certain embodiments, a PCI bus 24 may implement technologies such as PCI-X or PCI-E that provide significant increases in bandwidth. In certain embodiments, a secondary bus 24, such as a PCI bus 24, may support sound hardware 28, video hardware 30, IDE ports 32 for interfacing with hard drives or other storage devices, or any other number of components 34.

In a similar manner, a secondary bus 24, such as a PCI bus 24, may connect to one or several other bridges 36 for interfacing with other buses 38, 42, or components. For example, a bridge 36 may interface with other slower legacy buses 38, 39 having lower bandwidths. A legacy bus 38, 39 may interface with older but still useful adapter cards 42c, or other components 44, 46, 48. For example, a bridge 36 may connect to an ISA bus 38 (Industry Standard Architecture) that accepts many slower legacy adapter cards 42c. The bridge 36 may also connect to devices such as a real-time clock 46 that may store the current time and date even when the computer system 10 is powered off.

Other devices in the computer system 10 may include non-volatile memory 48 storing a basic input output system 48 (BIOS) to provide an interface between an installed operating system and hardware in the computer system 10. Other devices may include a keyboard and mouse controller 44, or other controllers 44, providing basic input and output functionality to external devices such as mice, keyboards, and the like.

Figure 2:
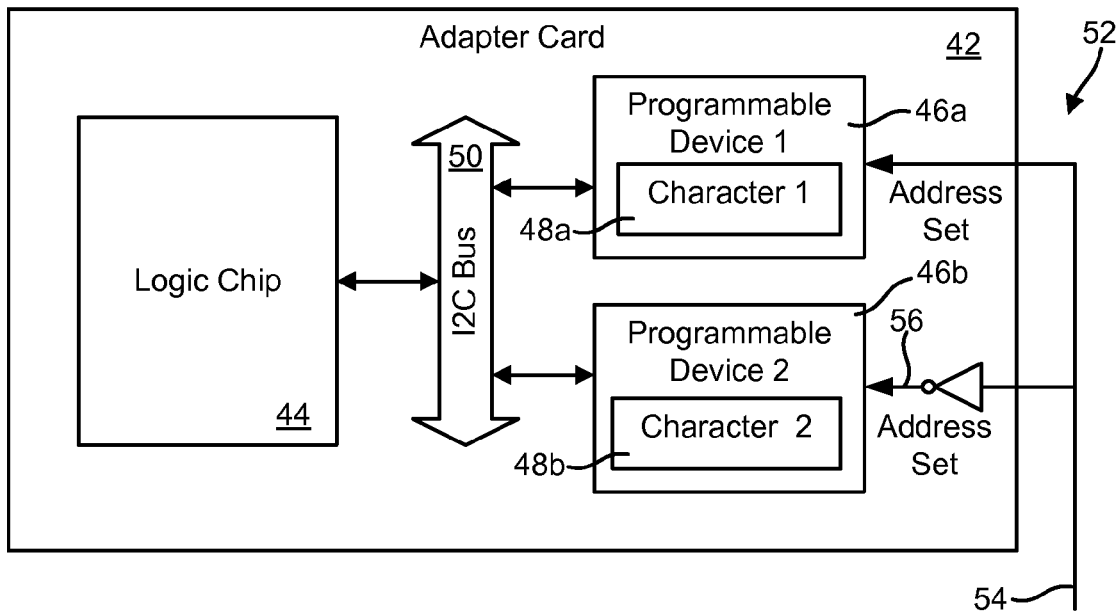
FIG. 2 is a high-level schematic block diagram of one embodiment of an adapter card utilizing a card input to modify the address of two or more programmable devices.

Referring to FIG. 2, as mentioned, an adapter card 42 may be used to provide additional versatility and functionality to a computer system 10. In selected embodiments, an adapter card 42 may include a circuit board insertable or otherwise connectable to an expansion slot or connector of a computer system 10, most typically on the computer's motherboard. Many adapter cards 42 include one or more logic chips 44, most typically ASICs, but which may also include programmable gate arrays, general purpose processors, or other types of integrated circuits. In certain embodiments, an ASIC 44 may be designed to provide unique functions to the adapter card 42 and may integrate several functions or logic control blocks into a single chip.

In certain embodiments, the logic chip 44 may read configuration and other programming data from a programmable device, such as a ROM, PROM, EEPROM, flash memory, or other programmable device mounted to the adapter card 42. For example, this data may be read into internal registers of an ASIC 44 when the chip is powered on, after a reset, or when code indicates that it should read the data. This data may give the ASIC 44 a defined personality or character.

In some cases, it may be desirable for an adapter card 42 to exhibit different characteristics depending on the application of the adapter card 42 or where the adapter card 42 is placed in a computer system 10. To provide this functionality, an adapter card 42 in accordance with the invention may be equipped to assume one of several characters 48a, 48b in situ (i.e., after installation or connection to a computer system 10). The configuration data used to program the logic chip 44 with these distinct characters 48a, 48b will be labeled "character 1" and "character 2" herein for discussion purposes.

In selected embodiments, an adapter card 42 in accordance with the invention may be equipped with multiple programmable devices 46a, 46b, each storing distinct character data 48a, 48b. In certain embodiments, the logic chip 44 may be configured to read character data 48a, 48b from a specific address when the chip 44 is powered on, reset, or when instructed to do so by code. For example, where a logic chip 44 communicates with a programmable device 46a, 46b by way of an I2C interface (i.e., over an I2C bus 50), the logic chip 44 may attempt to access character data by transmitting a specific address onto the bus 50 along with a request to read data located at the address. A programmable device 46a, 46b having the address assigned thereto may then respond with an acknowledge signal and transmit the character data 48a, 48b to the logic chip 44 onto the bus 50. The logic chip 44 may then receive and configure itself with the character data received over the bus 50.

Because the logic chip 44 requests data from a specific address, a switching mechanism 52 may be used to switch between the character data 48a, 48b by modifying the address of each programmable device 46a, 46b. In certain embodiments, an address of a programmable device 46a, 46b may be set by way of several I/O pins (e.g., three I/O pins) on the programmable device 46a, 46b. In certain embodiments, a card input 54 may be connected to one or more of the I/O pins of a first programmable device 46a and the inverse 56 of the card input 54 may be connected to the corresponding I/O pins of a second programmable device 46b.

In this way, the value of the card input 54 may be used to alter the address of each programmable device 46a, 46b such that it matches the specific address accessed by the logic chip 44. For example, a high value on the card input 54 may be used to set the address of a first programmable device 46a to match the specific address used by logic chip 44 (while changing the address of the second programmable device 46b to one not matching the specific address). Similarly, a low value on the card input 54 may be used to set the address of a second programmable device 46b to match the specific address used by logic chip 44 (while changing the address of the first programmable device 46a to one not matching the specific address). In this way, the logic chip 44 may initialize and program itself with one of two distinct versions of character data 48a, 48b depending on the value of the card input 54.

In certain embodiments, the card input 54 may be controlled with hardware or software on the computer system 10 and external to the adapter card 42. In this way, the computer system 10 may be able to control and set the character of the adapter card 42 as needed to fit a particular application. As will be explained in more detail hereafter, in other embodiments the card input 54 may be controlled through a manual action (e.g., manually flipping a switch).

Figure 3:
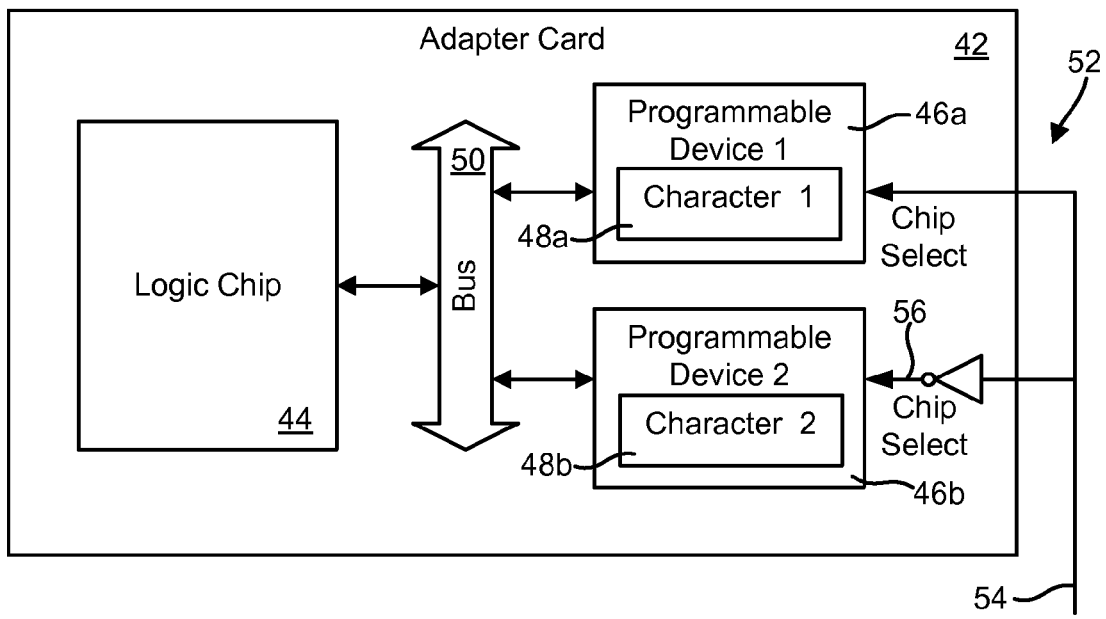
FIG. 3 is a high-level schematic block diagram of one embodiment of an adapter card utilizing a card input to assert and de-assert a chip select line of two or more programmable devices.

Referring to FIG. 3, in another embodiment, a switching mechanism 52 may be used to select one of several programmable devices 46a, 46b connected to a common bus 50 by asserting and de-asserting a chip select line of each programmable device 46a, 46b. For example, a card input 54 may be connected to a chip select line of a first programmable device 46a and the inverse 56 of the card input 54 may be connected to a chip select line of a second programmable device 46b. Other methods for asserting and de-asserting chip select lines may be used where there are more than two programmable devices 46a, 46b or where other devices are also connected to the bus 50. Upon initialization, the logic chip 44 may then read character data 48a, 48 from the programmable device 46a, 46b having the asserted chip select line.

Figure 4:
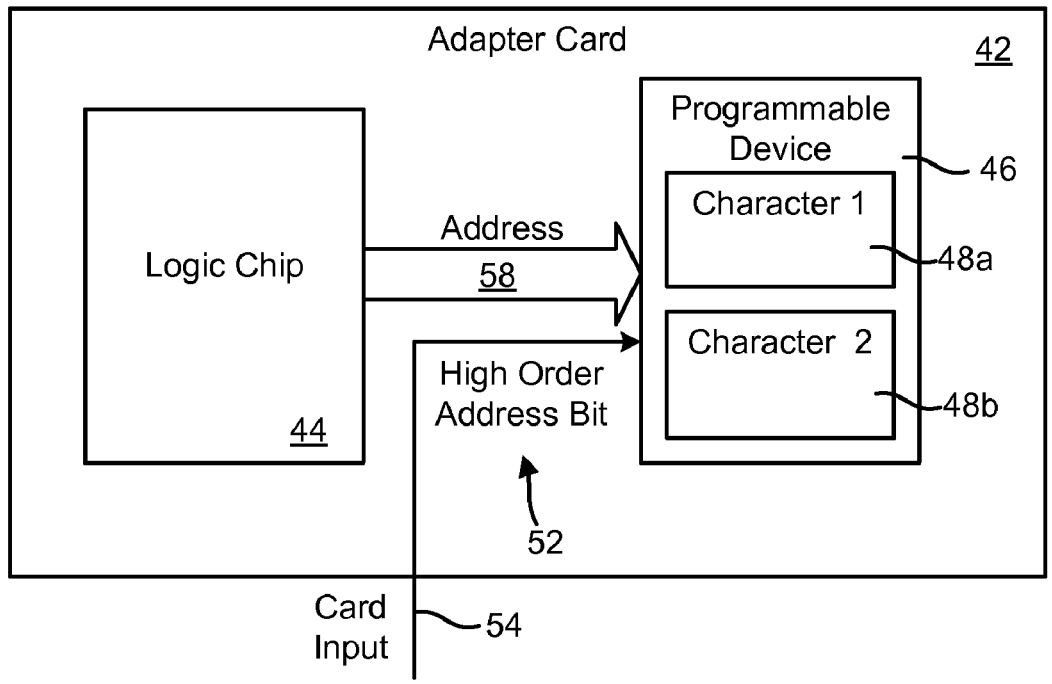
FIG. 4 is a high-level schematic block diagram of one embodiment of an adapter card utilizing a card input to modify the address space accessed on a programmable device.

Referring to FIG. 4, in another embodiment, different character data 48a, 48b may be stored in a single programmable device 46 in different address ranges. An external control, such as the card input 54, may be used to select which character data 48a, 48b is read by the logic chip 44. For example, in selected embodiments, a logic chip 44 may access a programmable device 46, such as flash memory, by way of a parallel address. First character data 48a may be stored in a high half of the programmable device 46 and second character data 48b may be stored in a low half of the programmable device 46.

A switching mechanism 52 may include a card input 54 to control a high order address bit of an address transmitted to the programmable device 46. In this way, a high value on the card input 54 may be used to access the high half of the programmable device 46 and thereby read first character data 48a. A low value on the card input 54 may be used to access a low half of the programmable device 46 and thereby read second character data 48b. Thus, a switching mechanism 52 in accordance with the invention may also be used to switch between different versions of character data 48a, 48b stored in a single programmable device 46.

Figure 5:
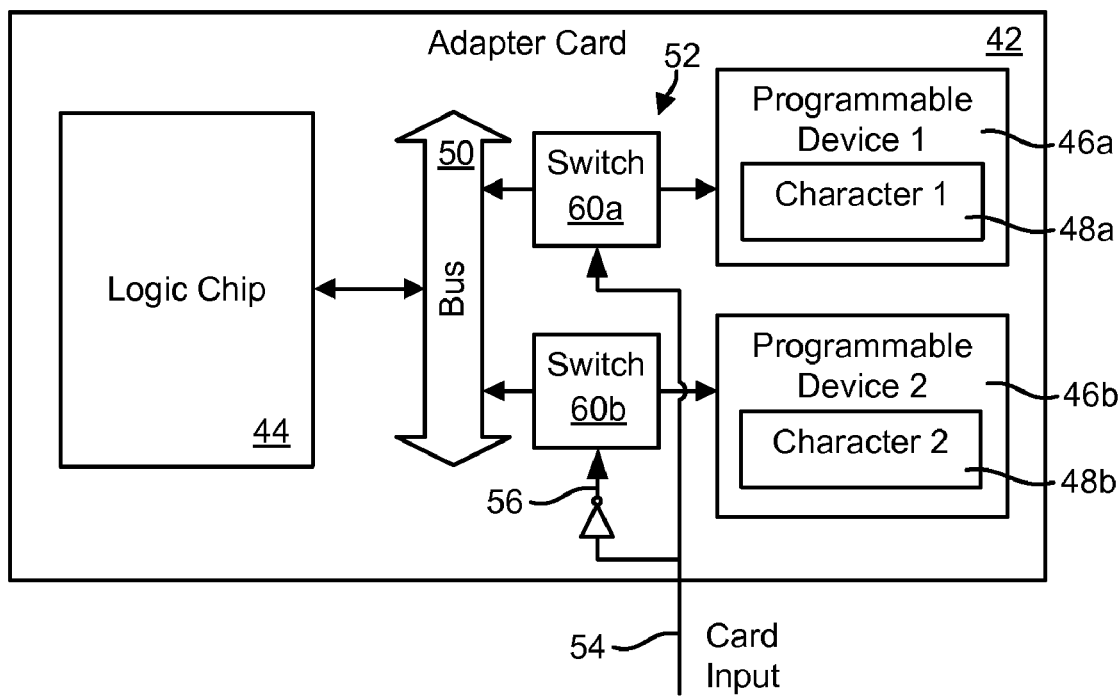
FIG. 5 is a high-level schematic block diagram of one embodiment of an adapter card using one or more switches, coupled to a card input, to toggle between two or more programmable devices.

Referring to FIG. 5, in another embodiment, a switching mechanism 52 may include one or more switches 60a, 60b to switch between several programmable devices 46a, 46b. For example, switches 60a, 60b may be used to selectively connect and disconnect each programmable device 46a, 46b from a bus 50. In such an embodiment, each programmable device 46a, 46b may be assigned the same address or range of addresses. A card input 54 may be used to control each of the switches 60a, 60b. For example, the card input 54 may be connected to a first switch 60a and the inverse 56 of the card input 54 may be connected to a second switch 60b. Thus, when the first switch 60a is closed, the other switch 60b is open and vice versa. Thus, only one programmable device 46a, 46b is connected to the bus 50 at any given time.

When the logic chip 44 attempts to read character data from the address assigned to the programmable devices 46a, 46b, data is retrieved from the programmable device 46a, 46b connected to the bus 50. Thus, one of two versions of character data 48a, 46b may be read from the programmable devices 46a, 46b depending on the value of the card input 54. This enables different character data to be read by the logic chip 44 by simply changing the card input 54

Figure 6:
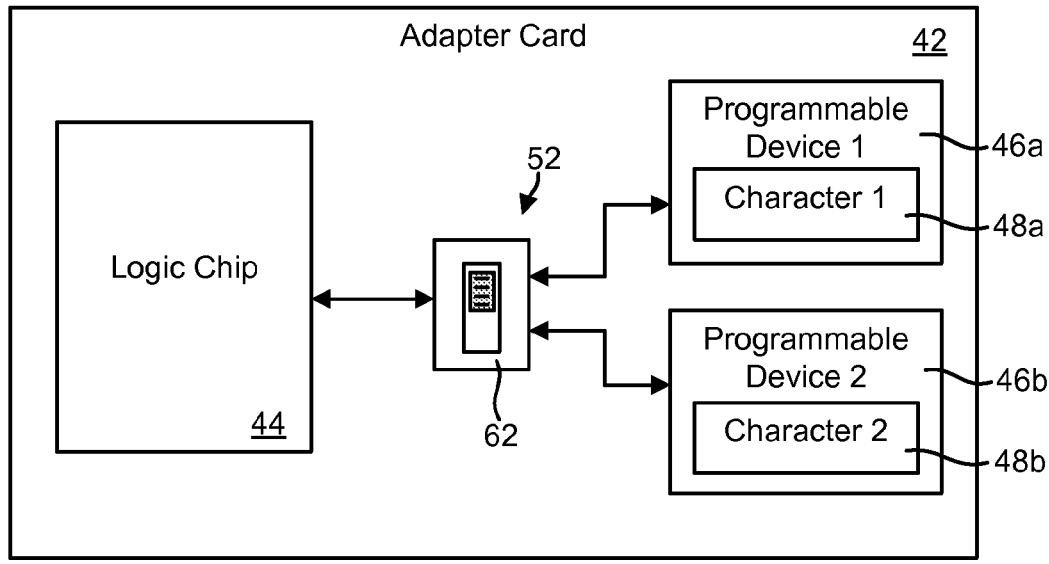
FIG. 6 is a high-level schematic block diagram of one embodiment of an adapter card using a manually operated switch to toggle between two programmable devices.

Referring to FIG. 6, in other embodiments, a switching mechanism 52 may include a manually operated switch 62 to switch between different programmable devices 46a, 46b, each storing different character data 48a, 48b. For example, the switch 62 in a first (e.g., upward) position may create a connection between the logic chip 44 and a first programmable device 46a while disconnecting a second programmable device 46b from the logic chip 44. The switch 62 in a second (e.g., downward) position may open the connection between the logic chip 44 and the first programmable device 46a and create a connection between the logic chip 44 and the second programmable device 46a. Such a switch 62 may be used to create a direct connection between the logic chip 44 and one of the programmable devices 46a, 46b, or be used to connect one of the programmable devices 46a, 46b to a bus connected to the logic chip 44.

Figure 7:
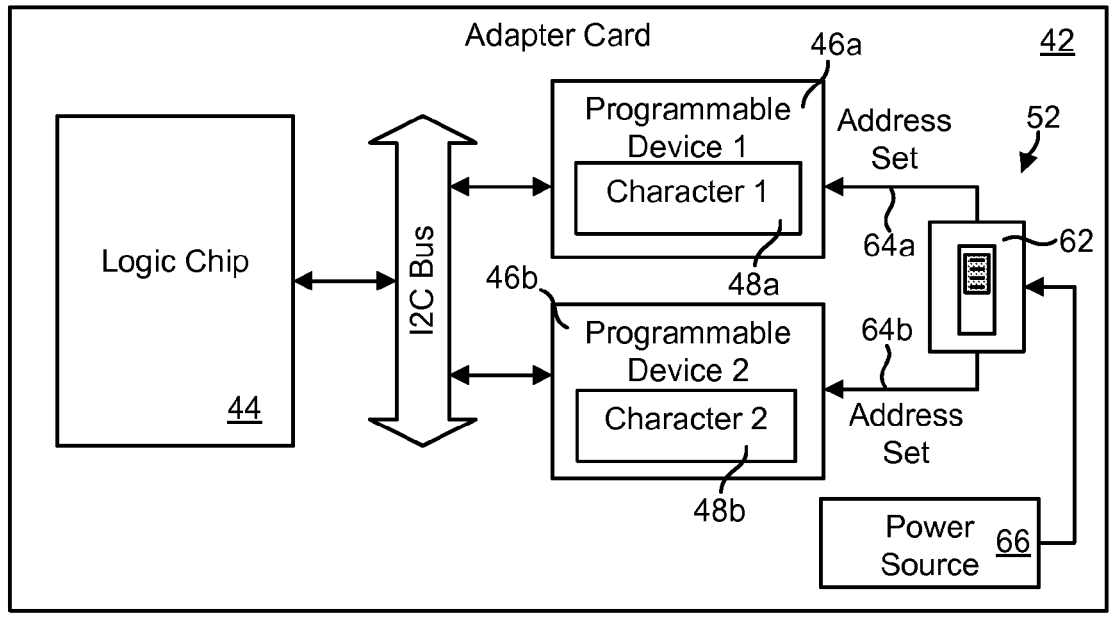
FIG. 7 is a high-level schematic block diagram of one embodiment of an adapter card using a manually operated switch to modify the address of two or more programmable devices.

Referring to FIG. 7, in another embodiment, a switching mechanism 52 may include a manually operated switch 62 to alter the address of various programmable devices 46a, 46b. For example, as previously mentioned, an address of a programmable device 46a, 46b may be set by way of various I/O pins connected to the programmable device 46a, 46b. In certain embodiments, a first output 64a of a switch 62 may be connected to one or more address pins of one programmable device 46a and a second output 64b of the switch 62 may be connected to one or more address pins of the other programmable device 46b. A power source 66 may provide power to the switch 62 to direct to the outputs 64a, 64b.

In this way, the switch 62 may be used to alter the addresses of the programmable devices 46a, 46b such that the address of one programmable device 46a, 46b matches a specific address accessed by the logic chip 44. For example, a high value on the output 64a (with a low value on the output 64b) may be used to set the address of a first programmable device 46a to match the specific address accessed by logic chip 44. Similarly, a high value on the output 64b (with a low value on the output 64a) may be used to set the address of a second programmable device 46b to match the specific address used by the logic chip 44. In this way, the logic chip 44 may initialize and program itself with one of two versions of character data 48a, 48b depending on the value of the outputs 64a, 64b.

Figure 8:
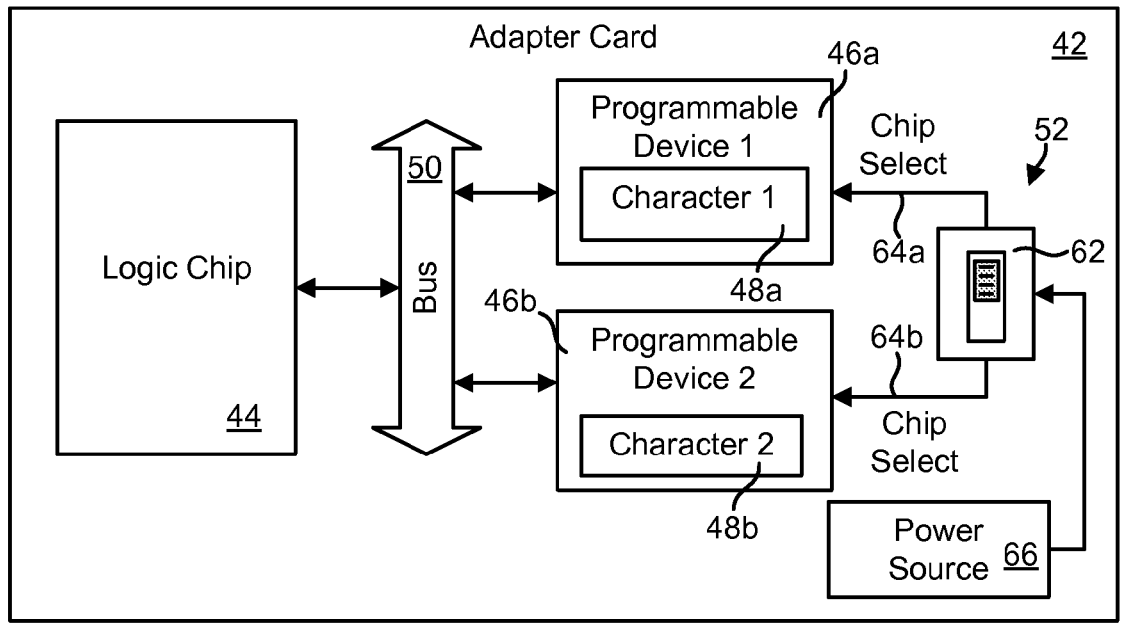
FIG. 8 is a high-level schematic block diagram of one embodiment of an adapter card utilizing a manually operated switch to assert and de-assert a chip select line of two or more programmable devices.

Referring to FIG. 8, in another embodiment, a switching mechanism 52 may include a manually operated switch 62 to select one of several programmable devices 46a, 46b connected to a common bus 50. The switch 62 may be used to assert and de-assert chip select lines of each programmable device 46a, 46b. For example, a first output 64a of the switch 62 may be connected to a chip select line of a first programmable device 46a and a second output 64b of the switch 62 may be connected to a chip select line of a second programmable device 46b. The chip select line of the first programmable device 46a may be asserted when the switch 62 is in a first position (e.g., upward) and the chip select line of the second programmable device 46b may be asserted when the switch 62 is in a second position (e.g., downward). Only one chip select line is asserted at any one time. The logic chip 44 may then read character data 48a, 48b from the programmable device 46a, 46b having the asserted chip select line.

Figure 9:
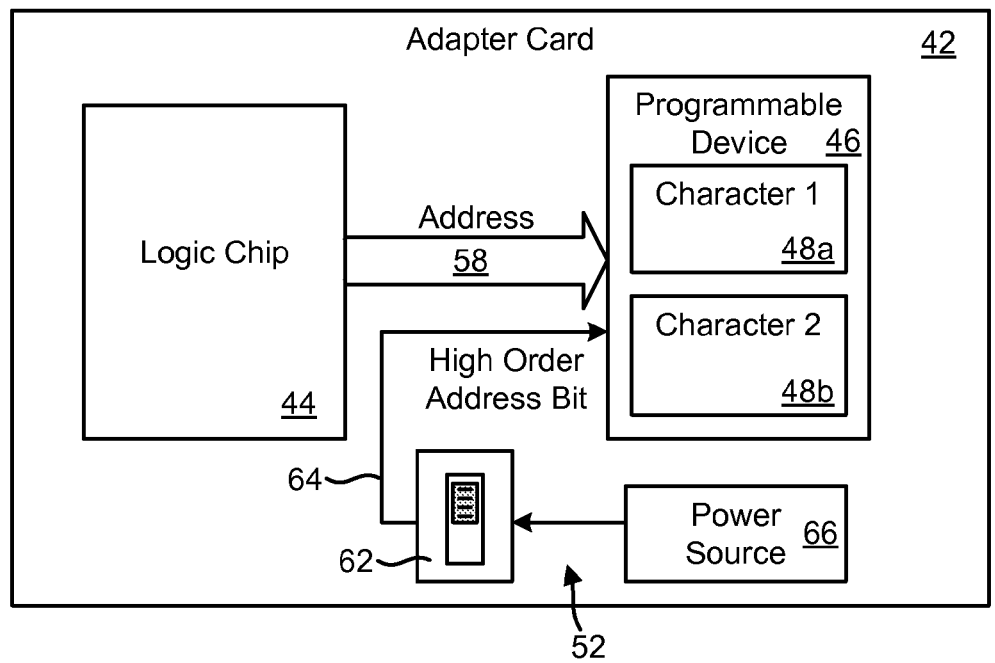
FIG. 9 is a high-level schematic block diagram of one embodiment of an adapter card utilizing a manually operated switch to modify the address space accessed in a programmable device.

Referring to FIG. 9, in another embodiment, various versions of character data 48a, 48b may be stored in different address ranges of a single programmable device 46. A switching mechanism 52 may include a manually operated switch 62 to select which character data is read by the logic chip 44. For example, where the logic chip 44 accesses the programmable device 46 by way of a parallel address, first character data 48a may be stored in a high half of the programmable device 46 and second character data 48b may be stored in a low half of the programmable device 46.

The switch 62 may be used to control a high order address bit of an address transmitted to the programmable device 46. Thus, a high value on the output 64 of the switch 62 may be used to access the high half of the programmable device 46 to read the first character data 48a. A low value on the output 64 may be used to access a low half of the programmable device 46 to read second character data 48b. In this way, the switch 62 may be used to switch between several versions of character data 48a, 48b stored in a single programmable device 46.

The adapter cards 42 illustrated in FIGS. 2 through 9 may be used in a wide variety of applications where two or more different characters 48a, 48b are needed or desirable. For example, in one embodiment, an adapter card 42 may be provided with PCIE ports that attach to two different computer systems 10. The CPU 12 of each computer system 10 may utilize generic discovery code to discover the adapter card 42. One PCIE port on the adapter card 42 may appear to be an endpoint while the other PCIE port may appear to be a switch. The adapter card 42 may be owned by either CPU 12.

Accordingly, the owning CPU 12 may see a switch so that it can configure the card, whereas the non-owning CPU 12 may see an endpoint so that it stops at that port. When ownership changes, the ports may be reconfigured so that the CPU 12 which previously saw an endpoint sees a switch, and vice versa. This is an example of how an adapter card 42 may be programmed or initialized with two different characters 48a, 48b, or configurations. The card I/O 54 may be used to designate which CPU 12 owns the adapter card 42 and to initialize the ports appropriately. This allows for rapid initialization and reduces the need for complicated system software to reconfigure the adapter card 42.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An adapter card comprising:
   a circuit board connectable to a motherboard of a computer system to enhance the functionality thereof;
   a logic chip mounted on the circuit board to provide functionality to the adapter card, the logic chip being configured to initialize after the circuit board is connected to the motherboard of the computer system, wherein the logic chip assumes a character based on data received during initialization;

at least one programmable device mounted on the circuit board and storing the data received by the logic chip during initialization, the data comprising first character data to program the logic chip to have a first character, and second character data to program the logic chip to have a second character; and a switching mechanism, controlled by an external input, configured to switch between the first and second character data, thereby causing the logic chip to read one of the first and second character data and assume a corresponding one of the first and second characters.

2. The adapter card of claim 1, wherein the at least one programmable device comprises a first programmable device and a second programmable device, the first programmable device storing the first character data, and the second programmable device storing the second character data.

3. The adapter card of claim 2, wherein the logic chip and the first and second programmable devices are connected to and communicate over a common bus.

4. The adapter card of claim 2, wherein the switching mechanism modifies an address of the first and second programmable devices.

5. The adapter card of claim 2, wherein the switching mechanism selectively asserts and de-asserts a chip select line of the first and second programmable devices.

6. The adapter card of claim 1, wherein the at least one programmable device comprises a single programmable device storing both the first and second character data in different address ranges.

7. The adapter card of claim 6, wherein the switching mechanism modifies an address used to access the single programmable device, thereby causing the logic chip to read from a different address range of the single programmable device.

8. The adapter card of claim 1, wherein the external input is a signal.

9. The adapter card of claim 8, wherein the signal is received through the motherboard.

10. The adapter card of claim 1, wherein the external input is a manual input.

11. A method comprising:
providing an adapter card connectable to a motherboard of a computer system to enhance the functionality thereof, the adapter card comprising a logic chip mounted thereon for providing functionality to the adapter card;
initializing the logic chip after the adapter card is connected to the motherboard of the computer;
reading, by the logic chip upon initialization, one of first character data to program the logic chip to have a first character, and second character data to program the logic chip to have a second character, the first and second character data being stored on at least one programmable device mounted on the adapter card; and
switching, in response to an external input, between the first and second character data, thereby causing the logic chip to read one of the first and second character data and assume a corresponding one of the first and second characters.

12. The method of claim 11, wherein reading comprises reading from a first programmable device and a second programmable device, the first programmable device storing the first character data, and the second programmable device storing the second character data.

13. The method of claim 12, wherein switching comprises modifying an address of the first and second programmable devices.

14. The method of claim 12, wherein switching comprises selectively asserting and de-asserting a chip select line of the first and second programmable devices.

15. The method of claim 11, wherein reading comprises reading from a single programmable device storing both the first and second character data in different address ranges.

16. The method of claim 15, wherein switching comprises modifying an address used to access the single programmable device, thereby causing the logic chip to read from a different address range of the single programmable device.

17. A system comprising:
a computer system configured to receive an adapter card to enhance the functionality of the computer system;
an adapter card connectable to the computer system and comprising:
a logic chip mounted on the adapter card to provide functionality to the adapter card, the logic chip being configured to initialize after the adapter card is connected to the motherboard of the computer system, wherein the logic chip assumes a character based on data read during initialization;
at least one programmable device mounted on the adapter card and storing the data read by the logic chip during initialization, the data comprising first character data to program the logic chip to have a first character, and second character data to program the logic chip to have a second character; and
a switching mechanism, controlled by an external input, configured to switch between the first and second character data, thereby causing the logic chip to read one of the first and second character data and assume a corresponding one of the first and second characters.

18. The system of claim 17, wherein the at least one programmable device comprises a first programmable device and a second programmable device, the first programmable device storing the first character data, and the second programmable device storing the second character data.

19. The system of claim 18, wherein the logic chip and the first and second programmable devices are connected to and communicate over a common bus.

20. The system of claim 18, wherein the switching mechanism modifies an address of the first and second programmable devices.

21. The system of claim 17, wherein the switching mechanism selectively asserts and de-asserts a chip select line of the first and second programmable devices.

22. The system of claim 17, wherein the at least one programmable device comprises a single programmable device storing both the first and second character data in different address ranges.

23. The system of claim 22, wherein the switching mechanism modifies an address used to access the single programmable device, thereby causing the logic chip to read from a different address range of the single programmable device.

24. An apparatus comprising:
an adapter card connectable to a computer system;
an application-specific integrated chip (ASIC) integrated with the adapter card to provide functionality thereto, the ASIC comprising at least one register and being configured to initialize after the adapter card is connected to the computer system, wherein the ASIC assumes a character based on data loaded into the at least one register during initialization;
at least one programmable device integrated with the adapter card and storing the data loaded into the at least one register upon initialization, the data comprising first character data to program the ASIC with a first character, and second character data to program the ASIC with a second character; and a switching mechanism, controlled by an external input, configured to switch between the first and second character data, thereby causing the at least one register to load one of the first and second character data such that the ASIC assumes a corresponding one of the first and second characters.

25. The apparatus of claim 24, wherein the adapter card further comprises a first port, connectable to a first computer system, and a second port, connectable to a second computer system.

26. The apparatus of claim 25, wherein:

the first character data provides programming to make the first port appear to be an endpoint to the first computer system and the second port appear to be a switch to the second computer system; and the second character data provides programming to make the first port appear to be a switch to the first computer system and the second port appear to be an endpoint to the second computer system.

27. The apparatus of claim 24, wherein the switching mechanism is operable after connecting the adapter card to a computer system.

* * * * *